United States Patent
Wu

(10) Patent No.: US 8,213,990 B2
(45) Date of Patent: Jul. 3, 2012

(54) SYSTEM FOR PROVIDING REMOTE SUBSCRIBER IDENTITY CARD TO MOBILE STATION AND METHODS THEREOF

(75) Inventor: Chun-Ying Wu, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 340 days.

(21) Appl. No.: 12/478,853

(22) Filed: Jun. 5, 2009

(65) Prior Publication Data

US 2010/0311467 A1     Dec. 9, 2010

(51) Int. Cl.
*H04B 1/38* (2006.01)
(52) U.S. Cl. ....... 455/558; 455/41.2; 455/436; 370/329; 370/341
(58) Field of Classification Search ............... 455/41.2, 455/436–444, 558; 370/238–329, 338, 341, 370/349
See application file for complete search history.

(56) References Cited

U.S. PATENT DOCUMENTS

| | | | | |
|---|---|---|---|---|
| 2004/0221241 A1* | 11/2004 | Kim | | 715/810 |
| 2005/0279826 A1* | 12/2005 | Merrien | | 235/380 |
| 2006/0193282 A1* | 8/2006 | Ikawa et al. | | 370/328 |
| 2008/0109656 A1* | 5/2008 | Kotzin | | 713/165 |
| 2008/0167074 A1* | 7/2008 | Van Steenbergen | | 455/558 |
| 2008/0244262 A1* | 10/2008 | Du et al. | | 713/155 |
| 2009/0245145 A1* | 10/2009 | Pennance | | 370/277 |
| 2010/0105433 A1* | 4/2010 | Lin et al. | | 455/558 |

FOREIGN PATENT DOCUMENTS

GB          2 363 291 A   * 12/2001

* cited by examiner

*Primary Examiner* — Kamran Afshar
*Assistant Examiner* — Marisol Fahnert
(74) *Attorney, Agent, or Firm* — Thomas|Kayden

(57) ABSTRACT

A system for providing a remote subscriber identity card to a mobile station is provided. The system includes a subscriber identity card, a Bluetooth module and a controller. The Bluetooth module establishes a Bluetooth connection to the mobile station. The controller accesses the subscriber identity card to obtain identity information and provides the obtained information to the mobile station via the Bluetooth connection such that the mobile station camps on a cell according to the obtained information.

23 Claims, 10 Drawing Sheets

SYSTEM FOR PROVIDING REMOTE SUBSCRIBER IDENTITY CARD TO MOBILE STATION AND METHODS THEREOF

BACKGROUND OF THE INVENTION

1. Field of the Invention

The invention relates to a system for providing a remote subscriber identity card, and more particularly to a system for providing multiple remote subscriber identity cards to a mobile station.

2. Description of the Related Art

Currently, the Global System for Mobile communication (GSM) standard is the most popular standard for mobile phones in the world. The GSM standard, standardized by the European Telecommunication Standards Institute (ETSI) is a cellular network structure and a Time Division Multiple Access (TDMA) system. For a carrier frequency, the TDMA system will divide a frame into eight time slots, wherein each time slot is used to transmit a channel data for a subscriber. Meanwhile, the General Packet Radio Service (GPRS) technology is one of the available technologies of a GSM system. The GPRS technology utilizes the unused channels in the GSM system to provide moderate speed data transmissions. The Wideband Code Division Multiple Access (W-CDMA) is a wideband spread-spectrum mobile air interface that utilizes the direct-sequence spread spectrum method of asynchronous code division multiple access to achieve higher speeds and support more users when compared to the implementation of time division multiplexing (TDMA) used by GSM systems. Time Division-Synchronous Code Division Multiple Access (TD-SCDMA) is another type of 3G mobile telecommunications standard.

Nowadays, a mobile phone with dual Subscriber Identity Module (SIM) cards is widely used, corresponding to different telephone numbers. The dual SIM mobile phone allows a user to use two communication services without carrying two phones at the same time. For example, the same mobile phone may be used for business and private use with separate numbers and bills. When any SIM card other than the inserted SIM cards required to be used, the mobile phone requires to be powered off to ensure that at least one inserted SIM card can be removed from the mobile phone without any damage. However, the un-removed SIM card lost its connectivity during power off. Additional processing time and power is consumed, as well, for boot-up, public land mobile network (PLMN) search or other requisite initiation procedures for all inserted SIM cards during re-powering on. The similar drawbacks also occur in a mobile phone with a single SIM card socket at the time to replace with another SIM card for use. Therefore, a system for carrying additional subscriber identity cards and capable of communicating with the mobile phone is introduced.

BRIEF SUMMARY OF THE INVENTION

Systems for providing a remote subscriber identity card to a mobile station and methods thereof are provided. An exemplary embodiment of a system for providing a remote subscriber identity card to a mobile station is provided. The system comprises: a subscriber identity card; a Bluetooth module establishing a Bluetooth connection to the mobile station; and a controller accessing the subscriber identity card to obtain identity information and providing the obtained information to the mobile station via the Bluetooth connection such that the mobile station camps on a cell according to the obtained information.

Moreover, an exemplary embodiment of a system for providing remote subscriber identity cards to a mobile station is provided. The system comprises a first subscriber identity card, a second subscriber identity card, a Bluetooth module establishing a Bluetooth connection to the mobile station, a controller and a selecting circuit. The controller accesses the first and second subscriber identity cards to obtain identity information and provides the obtained information to the mobile station via the Bluetooth connection such that the mobile station camps on a first cell according to the obtained information corresponding to the first subscriber identity card and a second cell according to the obtained information corresponding to the second subscriber identity card. The selecting circuit selectively couples the controller to the first subscriber identity card or the second subscriber identity card so as to access the coupled subscriber identity card.

Furthermore, an exemplary embodiment of a method for accessing a remote subscriber identity card enabled in a remote apparatus, performed by a mobile station, is provided. A Bluetooth connection between the remote apparatus and the mobile station is established. The identity information is obtained from the remote apparatus via the Bluetooth connection. A cell is camped on using the identity information.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
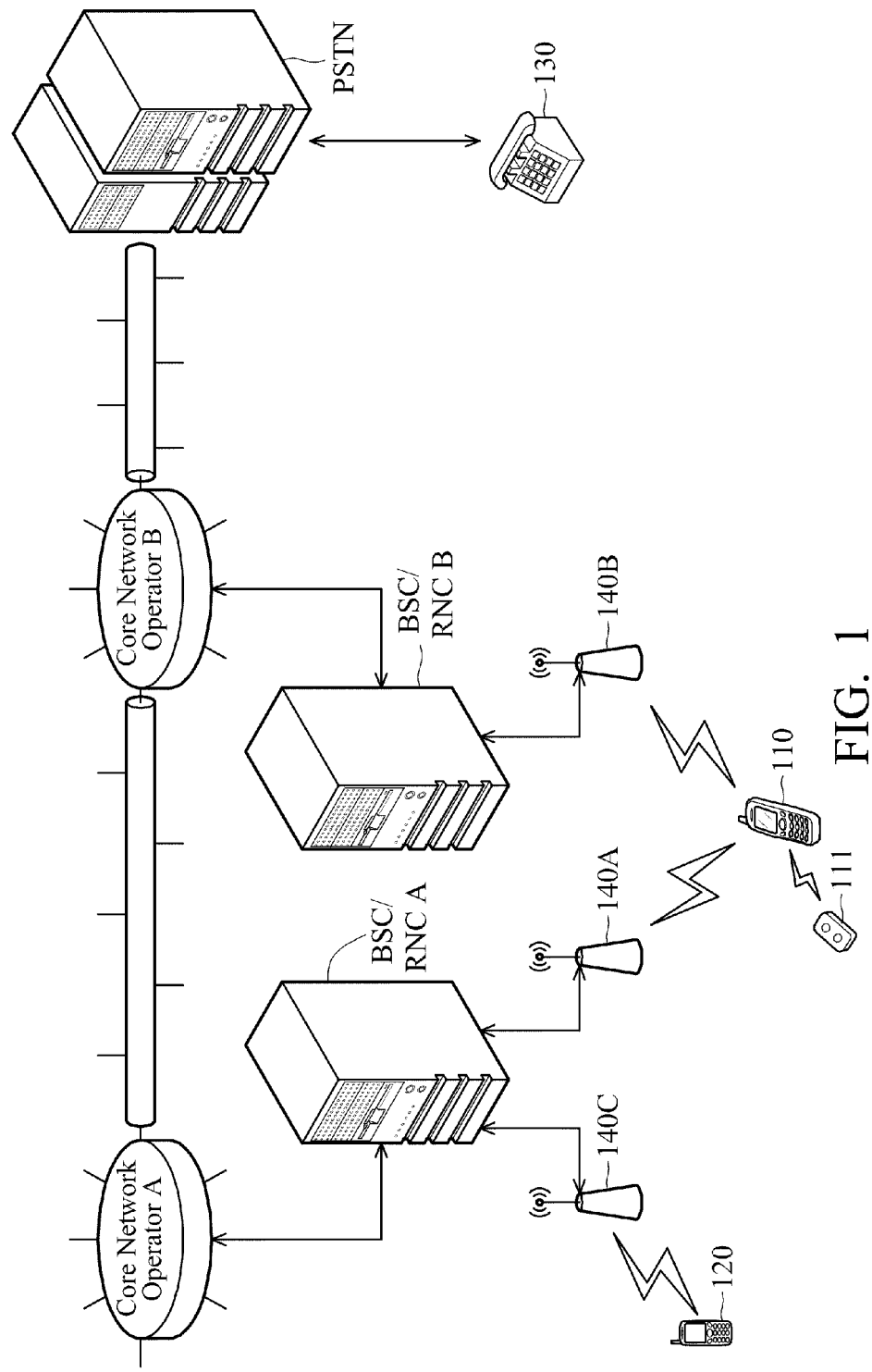
FIG. 1 shows a schematic diagram of a mobile communication network system.

The following description is of the best-contemplated mode of carrying out the invention. This description is made for the purpose of illustrating the general principles of the invention and should not be taken in a limiting sense. The scope of the invention is best determined by reference to the appended claims.

A subscriber identity module (SIM) card typically contains user account information, an international mobile subscriber identity (IMSI) and a set of SIM application toolkit (SAT) commands and provides storage space for phone book contacts. A micro-processing unit (MCU) of the Baseband chip (simply referred to as a Baseband MCU hereinafter) may interact with MCUs of the SIM cards (each simply referred to as a SIM MCU hereinafter) to fetch data or SAT commands from the plugged in SIM cards. A mobile station (MS) is immediately programmed after plugging in the SIM card. SIM cards may also be programmed to display custom menus for personalized services.

A universal SIM (USIM) card is inserted into a mobile station for Wideband Code Division Multiple Access (W-CDMA) or Time Division-Synchronous Code Division Multiple Access (TD-SCDMA) system (also called 3G) telephony communication. The USIM card stores user account information, an IMSI, authentication information and a set of USIM Application Toolkit (USAT) commands and provides storage space for text messages and phone book contacts. A Baseband MCU may interact with an MCU of the USIM card (each simply referred to as a USIM MCU hereinafter) to fetch data or SAT commands from the plugged in USIM cards. The phone book on the USIM card is greatly enhanced when compared to the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in the UMTS. A mobile station is immediately programmed after plugging in the USIM card.

A removable User Identity Module (R-UIM) or a Code Division Multiple Access (CDMA) Subscriber Identity Module (CSIM) card has already been developed for a CDMA mobile station and is similar to the GSM SIM and 3G USIM cards, but capable of working in CDMA networks. The R-UIM or the CSIM card is physically compatible with the GSM SIM card, and provides similar security mechanisms for the CDMA system.

The International Mobile Subscriber Identity (IMSI) is a unique number associated with a global system for mobile communication (GSM) or a universal mobile telecommunications system (UMTS) network user. The IMSI may be sent by a mobile station to a GSM or UMTS network to acquire other details of the mobile user in the Home Location Register (HLR) or as locally copied in the Visitor Location Register (VLR). An IMSI is typically 15 digits long, but may be shorter (for example MTN South Africa's IMSIs are 14 digits). The first 3 digits are the Mobile Country Code (MCC), and they are followed by the Mobile Network Code (MNC), which is either 2 digits (European standard) or 3 digits (North American standard). The remaining digits are the mobile subscriber identification number (MSIN) for a GSM or UMTS network user.

FIG. 1 shows a schematic diagram of a mobile communication network system. In FIG. 1, a mobile station (may be called user equipment interchangeably) 110 with dual subscriber identity cards A and B may simultaneously access the same or different core networks such as a Global System for Mobile Communications (GSM), Wideband Code Division Multiple Access (WCDMA), CDMA 2000 and Time Division-Synchronous Code Division Multiple Access (TD-SCDMA) network and the like after camping on two cells 140A and 140B (i.e. each may be a base station, a node-B or others). The subscriber identity card A or B may be a SIM, USIM, R-UIM or CSIM card. The mobile station 110 may make a voice or data call to a called party 120 or 130 through the GSM system with the Base Station Controller (BSC), WCDMA/CDMA2000/TD-SCDMA network with Radio Network Controller (RNC), Public Switched Telephone Network (PSTN) or any combinations thereof using either the subscriber identity cards A or B. For example, the mobile station 110 may make a voice call with the subscriber identity card A to the called party 120 through the cell 140A, an BSC/RNC A and a cell 140C in sequence, or make a voice call with the subscriber identity card B to the called party 120 through the cell 140B, an BSC/RNC B, a core network operator B, a core network operator A, the BSC/RNC A and the cell 140C in sequence. Moreover, the mobile station 110 may receive a phone call request with either of the subscriber identity cards A or B from the calling party 120 or 130. For example, the mobile station 110 may receive a phone call request to the subscriber identity card B from the calling party 130 via a Public Switched Telephone Network (PSTN), the core network operator B, the BSC/RNC B and the cell 140B. The subscriber identity card A or B may be inserted in a card holder 111 instead of the mobile station 110, in which a near distance communication module, such as a Bluetooth® module, or others, is provided to exchange data with the mobile station 110. The mobile station 110 may fetch IMSI, elementary files (EFs) or others from the subscriber identity card of the card holder 111 using a near distance communication protocol such as Bluetooth® or others.

In a GSM network, one inserted subscriber identity card of mobile station can be operated in idle mode and dedicated mode. Referring to FIG. 1, in idle mode, the mobile station 110 is either powered off, searches for or measures the Broadcast Control Channel (BCCH) with better signal quality from a base station (e.g. the cell 140A or 140B) provided by a specific network operator, or is synchronized to the BCCH of a specific base station to be ready to perform a random access procedure on the Random Access Channel (RACH) to request for a dedicated channel. In dedicated mode, the mobile station 110 occupies a physical channel and tries to synchronize therewith, and establishes logical channels and switches throughout them.

Specifically, in a GSM network, for each inserted subscriber identity card in idle mode, the mobile station 110 continuously listens to the BCCH from a base station and reads the BCCH information and conducts periodic measurements of the signaling strength of the BCCH carriers in order to select a suitable cell to be camped on. In idle mode, no exchange of signaling messages is presented with the network. The data required for Radio Resource Management (RR) and other signaling procedures is collected and stored, such as the list of neighboring BCCH carriers, thresholds for RR algorithms, Common Control Channel (CCCH) configurations, information regarding the use of RACH and Paging channel (PCH), or others. Such kind of information (e.g. system information (SI)) is broadcasted by a base station system on the BCCH and provides information about the network configuration. Moreover, the SI is available for all mobile stations currently in the cell. The SI comprises a Public Land Mobile Network (PLMN) code uniquely owned by a network operator. The PLMN code comprising a Mobile Country Code (MCC) and a Mobile Network Code (MNC), indicates which network operator is providing the communication services. In addition, a cell identity (ID) indicating which cell is broadcasting the BCCH is also contained in the SI. Furthermore, the SI may comprise network identification, neighboring cells, channel availability and power control requirements etc. The PLMN code may be acquired and stored in a corresponding subscriber identity card of the electronic device upon receiving the SI from the BCCH. The Base Station System (BSS) further continuously sends out, on all PCHs of a cell, valid Layer 3 messages (PAGING REQUEST) which the mobile station 110 can decode and recognize if its address (e.g. its IMSI of a specific SIM card) is paged. The mobile station 110 periodically monitors the PCHs to avoid loss of paging calls.

Each exchange of signaling messages with the network, e.g. BSS, Mobile Switching Center (MSC) and the similar, requires a Radio Resource Management (RR) connection and the establishment of an LAPDm connection between a mobile station and BSS. Setting up the RR connection can be initiated by the mobile station or network. In either situation, the mobile station sends a channel request (CHAN-QUEST) on the RACH in order to achieve an assignment of a channel on the Access Grant Channel (AGCH), also referred to as an immediate assignment procedure. The channel request may be rejected by an immediate assignment reject procedure. If the network does not immediately answer to the channel request, the request is repeated for a certain number of times. In the situation of a network-initiated connection, a procedure is preceded by a paging call (PAGING REQUEST) to be answered by the mobile station (PAGING RESPONSE). After an RR connection has been successfully completed, higher protocol layers, Connection Management (CM) and Mobility Management (MM) can receive and transmit signaling messages.

In contrast to the setup of connections, the release of connections is typically initiated by the network (CHANNEL RELEASE). The release of connections may occur when the signaling transaction ends, there are too many errors, or the channel is removed due to a higher priority call, e.g. an emergency call, or end of a call.

Once an RR connection has been set up, the mobile station has either a Stand-alone Dedicated Control Channel (SD-CCH) or a Traffic Channel (TCH) with an associated Slow/Fast Associated Control Channel (SACCH/FACCH) available for exclusive bidirectional use.

Setting up an MM connection from the mobile station presumes the existence of an RR connection, but a single RR connection can be used by multiple MM connections. If the MM connection can be established, the mobile station sends the message CM-SERVICE REQUEST to the network. The message CM-SERVICE REQUEST contains information regarding a mobile subscriber (IMSI or Temporary Mobile Subscriber Identity (TMSI)), where a TMSI has only local significance within a Location Area and must be used together with the Location Area Identity (LAI) for the unique identification of a subscriber, as well as information regarding the requested service (outgoing voice call, short message service SMS transfer, activation or registration of a supplementary service, or others). If the mobile station receives the message CM-SERVICE ACCEPT or local message from the RR sub-layer that enciphering has been activated, it is treated as an acceptance of the service request, and the requesting CM entity is informed about the successful setup of an MM connection. Otherwise, if the service request has been rejected by the network, the mobile station receives a message CM-SERVICE REJECT, and the MM connection cannot be established.

In a W-CDMA or TD-SCDMA network, one inserted subscriber identity card of mobile station can be operated in idle mode and connected mode Referring to FIG. 1, in idle mode, the mobile station selects (either automatically or manually) a PLMN to contact. The mobile station continuously listens to the BCCH to acquire an SI comprising a PLMN code uniquely owned by a network operator. The PLMN code comprising an MCC and an MNC indicates which network operator is providing communication services. In addition, an ID indicating which cell is broadcasting the BCCH is also contained in the SI. The PLMN code may be acquired and stored in a corresponding subscriber identity card of the electronic device upon receiving the SI from the BCCH. The mobile station searches for a suitable cell of the chosen PLMN, chooses that cell to provide available services, and tunes to the cell's control channel, also referred to as "camping on a cell". After camping on a cell in idle mode, the mobile station can receive system information and cell broadcast messages from a node-B (e.g. the cell 140A or 140B). The mobile station stays in idle mode until the node-B transmits a request to establish a Radio Resource Control (RRC) connection. In idle mode, the mobile station is identified by non-access stratum identities such as IMSI, TMSI and Packet-TMSI (P-TMSI) identities.

In the Cell_DCH state of connected mode, a dedicated physical channel is allocated to the mobile station, and the mobile station is known by its serving radio network controller (RNC) on a cell or active set level. The mobile station performs measurements and sends measurement reports according to measurement control information received from the RNC. The mobile station with certain capabilities monitors the Forward Access Channel (FACH) for system information messages. In the Cell_FACH state of a connected mode, no dedicated physical channel is allocated for the mobile station, but a Random Access Channel (RACH) and FACH are used instead, for transmitting both signaling messages and small amounts of user plane data. In this state, the mobile station also listens to the Broadcast Channel (BCH) to acquire system information. The mobile station performs cell reselections, and after a reselection the mobile station typically sends a Cell Update message to the RNC, so that the RNC knows the mobile station's location on a cell level. In the Cell_PCH state of a connected mode, the mobile station is known on a cell level in a Serving Radio Network Controller (SRNC), but the mobile station can be reached only via the Paging Channel (PCH). The URA_PCH state of a connected mode is very similar to the Cell_PCH state, except that the mobile station does not execute Cell Update after each cell reselection procedure, but instead reads the UMTS Terrestrial Radio Access Network (UTRAN) Registration Area (URA) identities from the BCH, and only if the URA changes (after cell reselection) does the mobile station inform its location to the SRNC. The mobile station leaves the connected mode and returns to the idle mode when the RRC connection is released or following RRC connection failure.

The establishment of an RRC connection and Signaling Radio Bearers (SRB) between a mobile station and UTRAN (RNC) is initiated by a request from higher layers (non-access stratum) on the mobile station side. In a network-originated case, the establishment is preceded by an RRC Paging message. The UTRAN (RNC) may respond with an RRC Connection Set-up message including a dedicated physical channel assignment for the mobile station (move to the Cell-DCH state), or a command to instruct the mobile station to use common channels (move to the Cell_FACH state).

Figure 2:
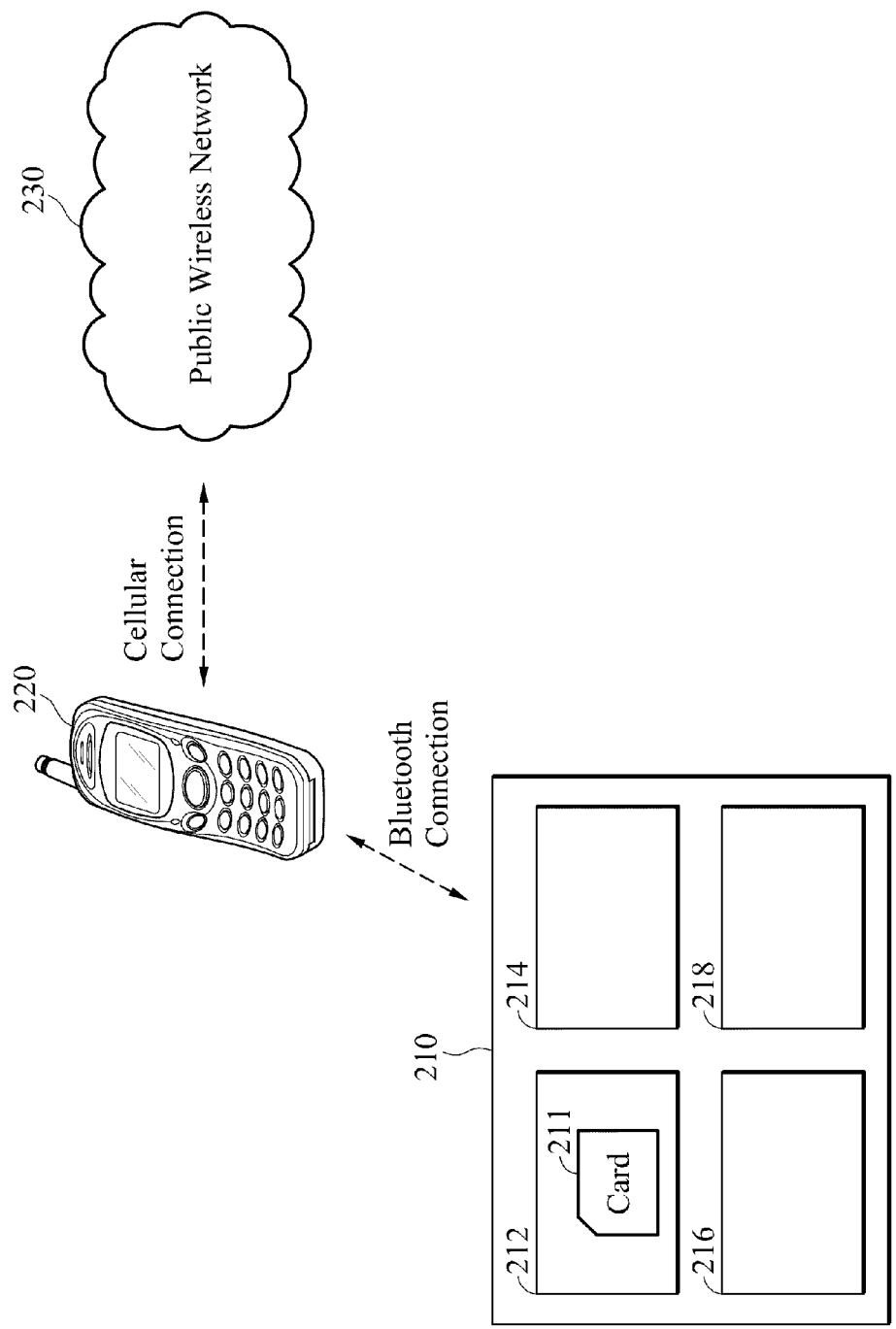
FIG. 2 shows a schematic diagram illustrating a mobile communication network system according to an embodiment of the invention.

FIG. 2 shows a schematic diagram illustrating a mobile communication network system according to an embodiment of the invention. In FIG. 2, a near distance link, such as a Bluetooth® Link, or others, is established between a remote apparatus 210 and a mobile station 220. The remote apparatus 210 may comprise one or more sockets for disposing various subscriber identity cards and may be implemented in the card holder 111 as shown in FIG. 1. For example, the remote apparatus 210 contains at least four sockets 212, 214, 216 and 218. When a subscriber identity card 211 is inserted into the socket 212 of the remote apparatus 210 and enables, the mobile station 220 may access the subscriber identity card 211 via the Bluetooth connection between the mobile station 220 and the remote apparatus 210. After receiving the International Mobile Subscriber Identity (IMSI) and requisite EFs of the subscriber identity card 211, the mobile station 220 may accordingly camp on a cell of a public wireless network 230. In the embodiment, the subscriber identity card 211 is regarded as a remote subscriber identity card for the mobile station 220, and at most four subscriber identity cards can be inserted in the remote apparatus 210.

Figure 3A:
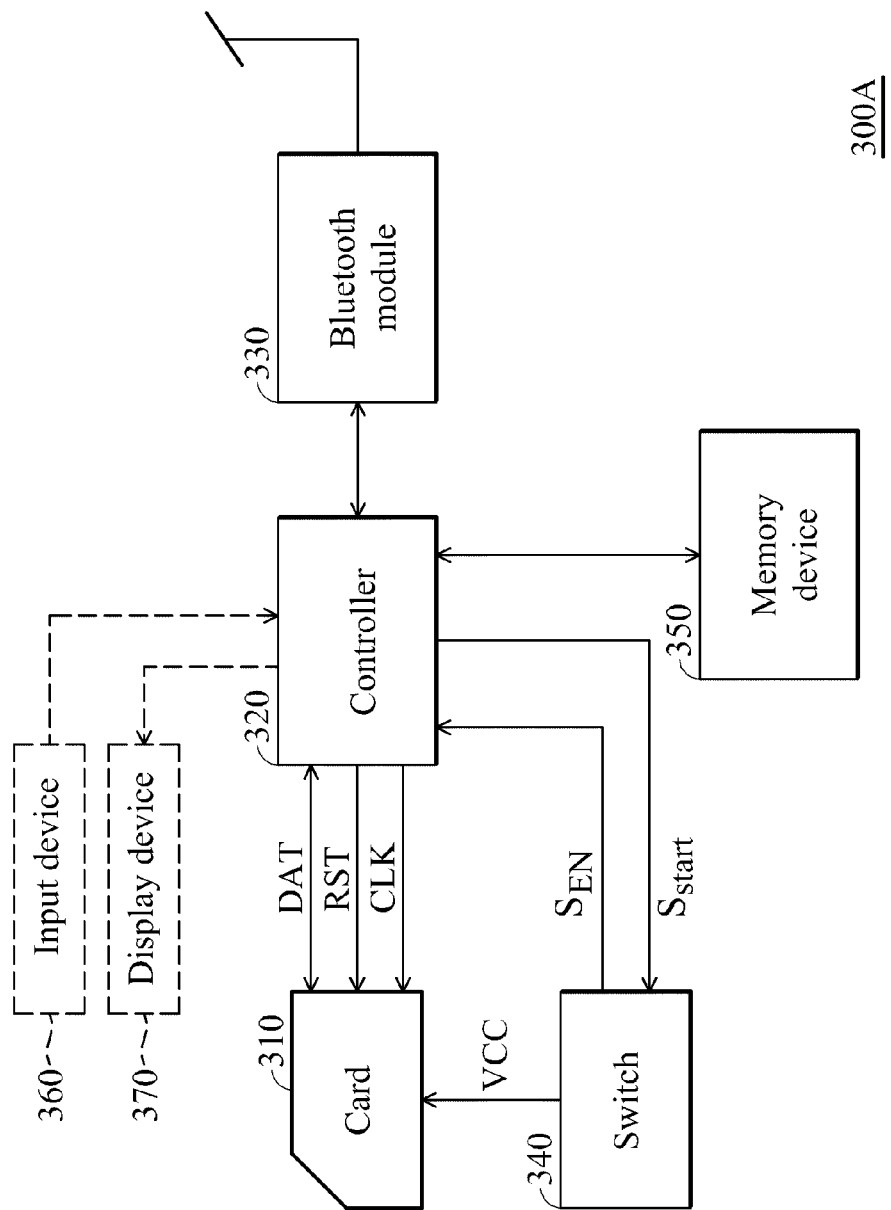
FIG. 3A shows a block diagram of a remote apparatus according to an embodiment of the invention.

FIG. 3A shows a block diagram of a remote apparatus 300A according to an embodiment of the invention. The remote apparatus 300A comprises a subscriber identity card 310 inserted in a socket (not shown), a controller 320, a Bluetooth module 330, a switch 340 and a memory device 350. The switch 340 is used to enable or disable the subscriber identity card 310. When the switch 340 is switched on, the switch 340 provides an enable signal $S_{EN}$ to the controller 320, and then the controller 320 generates a start signal $S_{start}$ to the switch 340. After receiving the start signal $S_{start}$, the switch 340 provides a voltage VCC to the subscriber identity card 310 as an operating voltage of the subscriber identity card 310. As the voltage VCC is provided to the subscriber identity card 310, the controller 320 accesses the subscriber identity card 310 via the related signals, such as the data signal (ex. DAT), reset signal (ex. RST) and clock signal (ex. CLK). After reading the International Mobile Subscriber Identity (IMSI) of the subscriber identity card 310, the controller 320 stores the IMSI into the memory device 350. When a Bluetooth connection between the remote apparatus 300A and a mobile station has been established, the controller 320 may provide the stored data regarding the IMSI to the mobile station via the Bluetooth module 330 such that the mobile station may camp on a cell using the IMSI and communicate with a corresponding node (CN). When the switch 340 is switched off, the enable signal $S_{EN}$ is absent, and the controller 320 controls the switch 340 to stop providing voltage VCC to the subscriber identity card 310, i.e. the subscriber identity card 310 is disabled. Next, the controller 320 removes the stored data corresponding to the disabled subscriber identity card 310 from the memory device 350 and notifies the mobile station to stop camping on the cell. In one embodiment, the remote apparatus 300A may further comprise an input device 360 which provides an interface for user to input a specific code (e.g. PIN code) when the SIM card is protected. Furthermore, the remote apparatus 300A may further comprise a display device 370 for displaying the status and information of the subscriber identity card 310 and the input code provided by the input device 360.

Figure 3B:
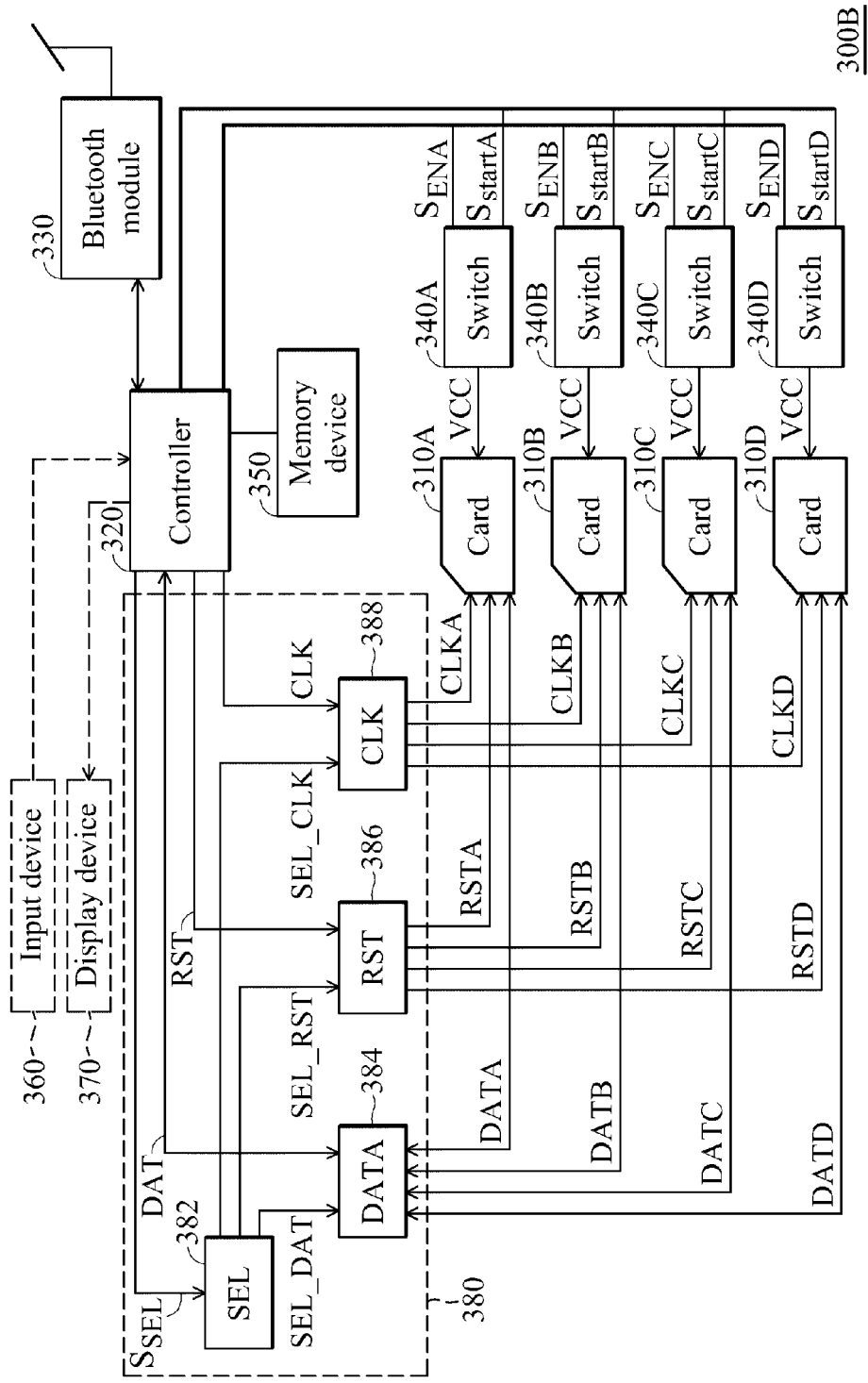
FIG. 3B shows a block diagram of a remote apparatus according to another embodiment of the invention.

FIG. 3B shows a block diagram of a remote apparatus 300B according to another embodiment of the invention. Compared with the remote apparatus 300A shown in FIG. 3A, the remote apparatus 300B may provide more remote subscriber identity cards to the mobile station. The remote apparatus 300B comprises four subscriber identity cards 310A-310D, a controller 320, a Bluetooth module 330, four switches 340A-340D, a memory device 350 and a selecting circuit 380. The switches 340A-340D are used to enable or disable the subscriber identity cards 310A-310D, respectively. For example, when the switch 340B is switched on, the switch 340B provides an enable signal $S_{ENB}$ to the controller 320, and then the controller 320 may generate a start signal $S_{startB}$ to the switch 340B. After receiving the start signal $S_{startB}$, the switch 340B provides a voltage VCC to the subscriber identity card 310B as an operating voltage of the subscriber identity card 310B. Similarly, when the switch 340A, 340C or 340D is switched on, the corresponding enable signal $S_{ENA}$, $S_{ENC}$ or $S_{END}$ is provided to the controller 320, so as to provide the operating voltage to the enabled subscriber identity card 310A, 310C or 310D by the start signal $S_{startA}$, $S_{startC}$ or $S_{startD}$.

In FIG. 3B, the selecting circuit 380 comprising four connectors 382, 384, 386 and 388 is used as an example, and does not limit the invention. The controller 320 provides a selecting signal $S_{SEL}$ to the selecting circuit 380 to selectively couple/connect the controller 320 to one of the subscriber identity cards 310A-310D, wherein the selecting signal $S_{SEL}$ indicates which subscriber identity card is to be accessed. After receiving the selecting signal $S_{SEL}$, the connector 382 generates three signals SEL_DAT, SEL_RST and SEL_CLK to control the connectors 384, 386 and 388, respectively. The connectors 384, 386 and 388 are used to transfer the data signal, the reset signal and the clock signal between the subscriber identity card to be accessed and the controller 320, respectively. For example, assuming that the subscriber identity card 310B is the subscriber identity card to be accessed, the controller 320 provides the selecting signal $S_{SEL}$ indicating that the subscriber identity card 310B is selected to the connector 382, so as to separately generate the signals SEL_DATA, SEL_RST and SEL_CLK. Next, the connector 384 transfers the data signal DAT from the controller 320 to the subscriber identity card 310B as the data signal DATB when the controller 320 writes data into the subscriber identity card 310B, or transfers the data signal DATB from the subscriber identity card 310B to the controller 320 as the data signal DAT when the controller 320 reads data from the subscriber identity card 310B. Simultaneously, the connector 386 transfers the reset signal RST from the controller 320 to the subscriber identity card 310B as the reset signal RSTB, and the connector 388 transfers the clock signal CLK from the controller 320 to the subscriber identity card 310B as the clock signal CLKB. Therefore, the controller 320 is electrically connected to the subscriber identity card 310B.

Referring to FIG. 3B, when any subscriber identity card is enabled, the controller 320 may control the selecting circuit 380 to access the enabled subscriber identity card and provide the IMSI of the enabled subscriber identity card to the mobile station via the Bluetooth module 330. Therefore, the mobile station may use the enabled subscriber identity card as a remote subscriber identity card to camp on a corresponding cell. In the embodiment, the remote apparatus 300B can provide four remote subscriber identity cards for the mobile station without increasing cost of the mobile station. Furthermore, when one of the switches 340A-340D is switched off, the enable signal corresponding to the off switch is absent, and then the controller 320 may control the off switch to stop providing voltage VCC to the corresponding subscriber identity card, i.e. the subscriber identity card to be disabled. Next, the controller 320 may notify the mobile station to stop camping on the cell corresponding to the disabled subscriber identity card. Similarly, the remote apparatus 300B may further comprise the input device 360 as an interface for user to input a specific code when the enabled subscriber identity card is protected. Furthermore, the remote apparatus 300B may further comprise the display device 370 for displaying the status and information of the subscriber identity cards 310A-310D and the input code provided by the input device 360.

Figure 4:
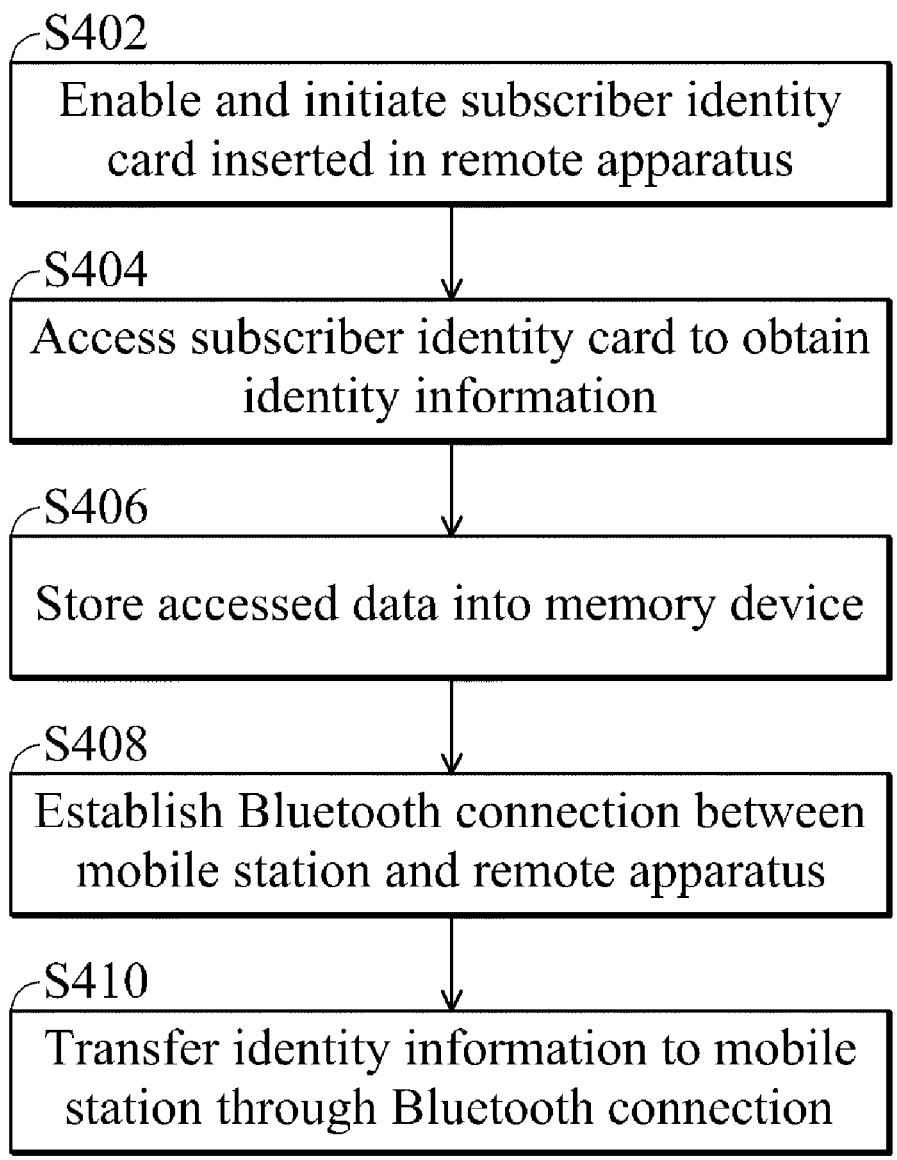
FIG. 4 shows a flow chart illustrating providing a remote subscriber identity card to a mobile station, performed by a controller of a remote apparatus according to an embodiment of the invention.

FIG. 4 shows a flow chart illustrating providing a remote subscriber identity card to a mobile station, performed by a controller of a remote apparatus according to an embodiment of the invention. The controller may be implemented in software code to be executed by one or more micro control units, dedicated hardware circuits, or a combination thereof. First, a subscriber identity card inserted in the remote apparatus is enabled and initiated (step S402). Next, the controller accesses the subscriber identity card to obtain identity information of the subscriber identity card (step S404), such as an IMSI of the subscriber identity card, and then the controller stores the accessed data (e.g. the obtained information) into a memory device of the remote apparatus (step S406). Next, a Bluetooth connection between the mobile station and the remote apparatus is established by device discovery and pairing (step S408). Next, the identity information is transferred to the mobile station through the Bluetooth connection (step S410). Subsequently, the mobile station may camp on a cell and communicate with a corresponding node via the camped on cell using the identity information from the remote apparatus. Furthermore, after Bluetooth connection between the mobile station and the remote apparatus is established, the remote apparatus may transmit the identity information of any new subscriber identity card which is switched on to the mobile station. Subsequently, the mobile station may camp on a cell and communicate with a corresponding node via the camped on cell using the new identity information. Note that the controller of the remote apparatus may deliver other requisite information to the mobile station via Bluetooth connection, such as an encrypted value calculated by the switched subscriber identity card for authentication.

Figure 5:
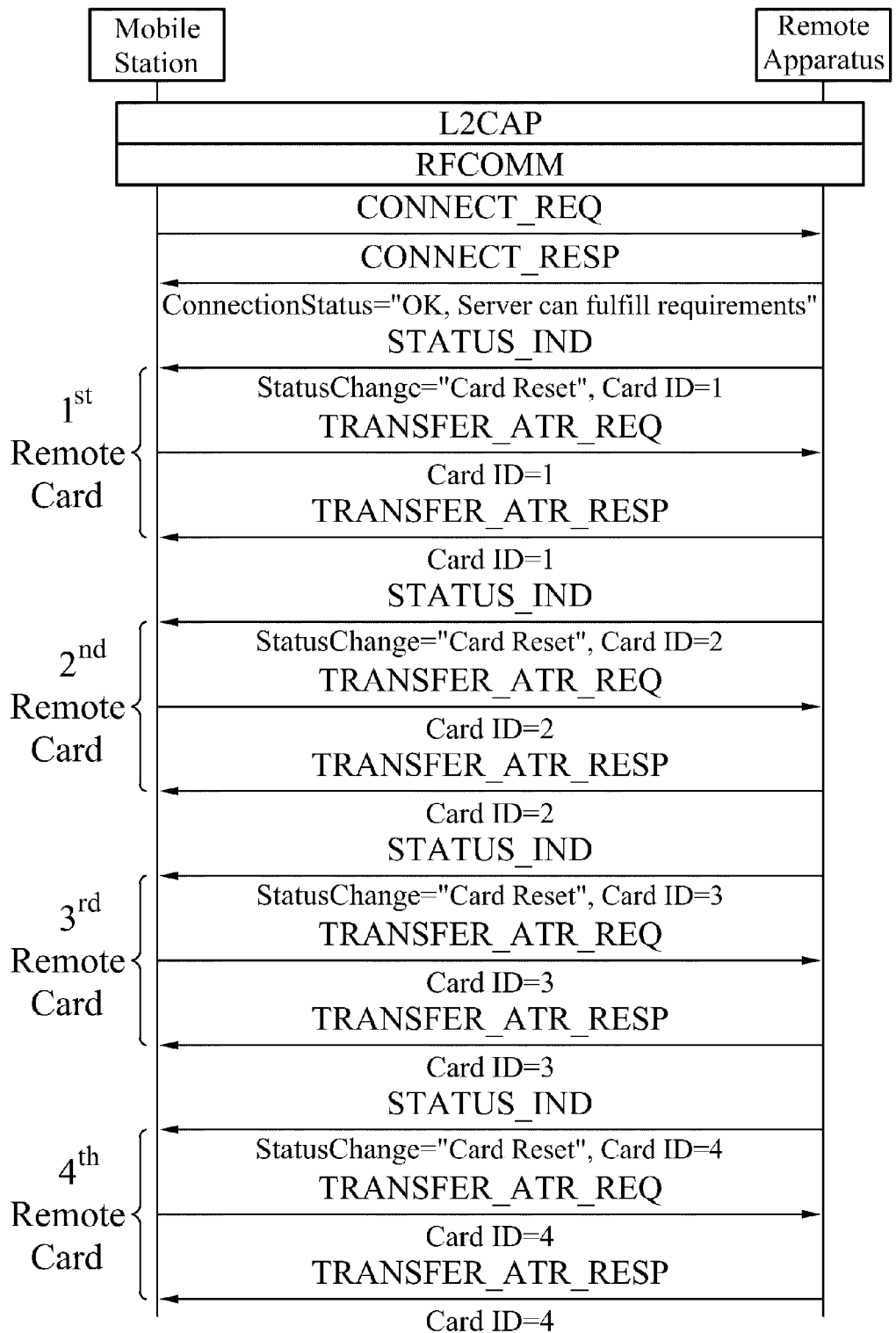
FIG. 5 shows a sequence diagram illustrating message exchange for establishing SIM Access Profile (SAP) connection between a mobile station and a remote apparatus according to an embodiment of the invention.

SIM Access Profile (SAP) defines the protocols and procedures that could be used to access a GSM SIM card, a UICC card or an R-UIM card via a Bluetooth link. FIG. 5 shows a sequence diagram illustrating message exchange for establishing SAP connection between a mobile station and a remote apparatus according to an embodiment of the invention. First, before a SAP message is transferred, the mobile station and the remote apparatus must have established L2CAP and RFCOMM connections. "L2CAP" is the abbreviation for "Logical Link Control and Adaptation Protocol" which provides a multiplexing role allowing many different applications to share the resources of an asynchronous/isochronous logical link (ACL-U) logical link between the mobile station and the remote apparatus. "RFCOMM" is the abbreviation for "Radio Frequency Communication", which emulates the serial cable line settings and status of an RS-232 serial port and is used for providing serial data transfer. After RFCOMM connection is established, the mobile station may issue a CONNECT_REQ message to the remote apparatus, and then the remote apparatus may answer with the CONNECT_RESP message. After the CONNECT_RESP message with the parameter "ConnectionStatus" set to "OK, Server can fulfill requirements" has been sent, the remote apparatus informs the mobile station about the status of its subscription module connection by sending the STATUS_IND message. If a subscriber identity card inserted in the remote apparatus is switched on, the remote apparatus sends the STATUS_IND message with the parameter "Card reset" to the mobile station, and then the mobile station requests the Answer To Reset (ATR) of the subscriber identity card with the TRANSFER_ATR_REQ message. After receiving the TRANSFER_ATR_REQ message, the remote apparatus may send the TRANSFER_ATR_RESP message to the mobile station. If no error has occurred, the TRANSFER_ATR_RESP message may contain the result code "OK, request processed correctly".

Figure 6:
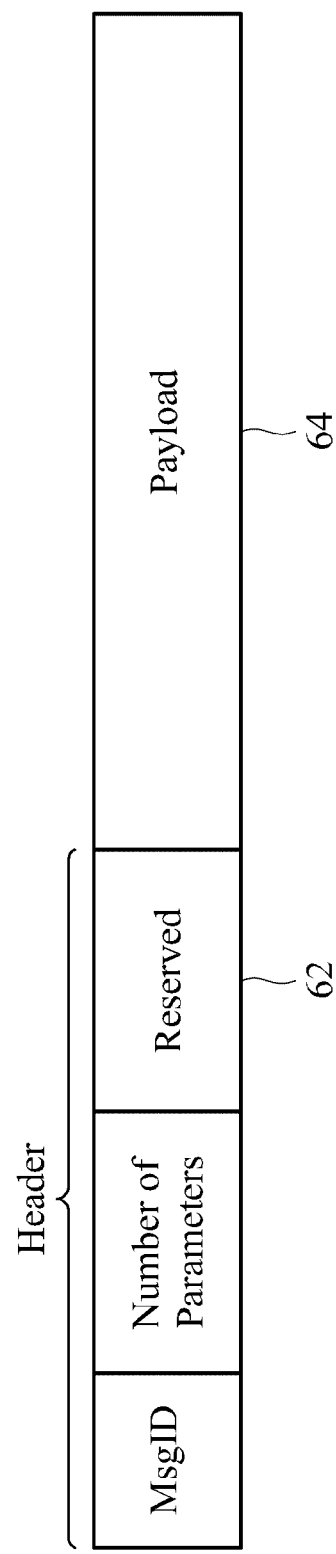
FIG. 6 shows a diagram illustrating the SAP message format.

Furthermore, the remote apparatus may have multiple subscriber identity cards inserted in it, wherein each subscriber identity card has a specific card identification (ID). Each card ID may be carried in a reserved field 62 of the header or the payload 64 of the messages, as shown in FIG. 6. Furthermore, by registering various channels, each SAP connection corresponding to different card IDs may be established at individual channels. Referring to FIG. 5, assuming that four subscriber identity cards inserted into the remote apparatus are switched on, the remote apparatus may informs the mobile station about the statuses of the subscriber identity cards by sending the STATUS_IND message four times. As shown in FIG. 5, the STATUS_IND, TRANSFER_ATR_REQ and TRANSFER_ATR_RESP messages comprises information regarding the card ID, such as "Card ID=1", "Card ID=2", "Card ID=3" and "Card ID=4".

Figure 7:
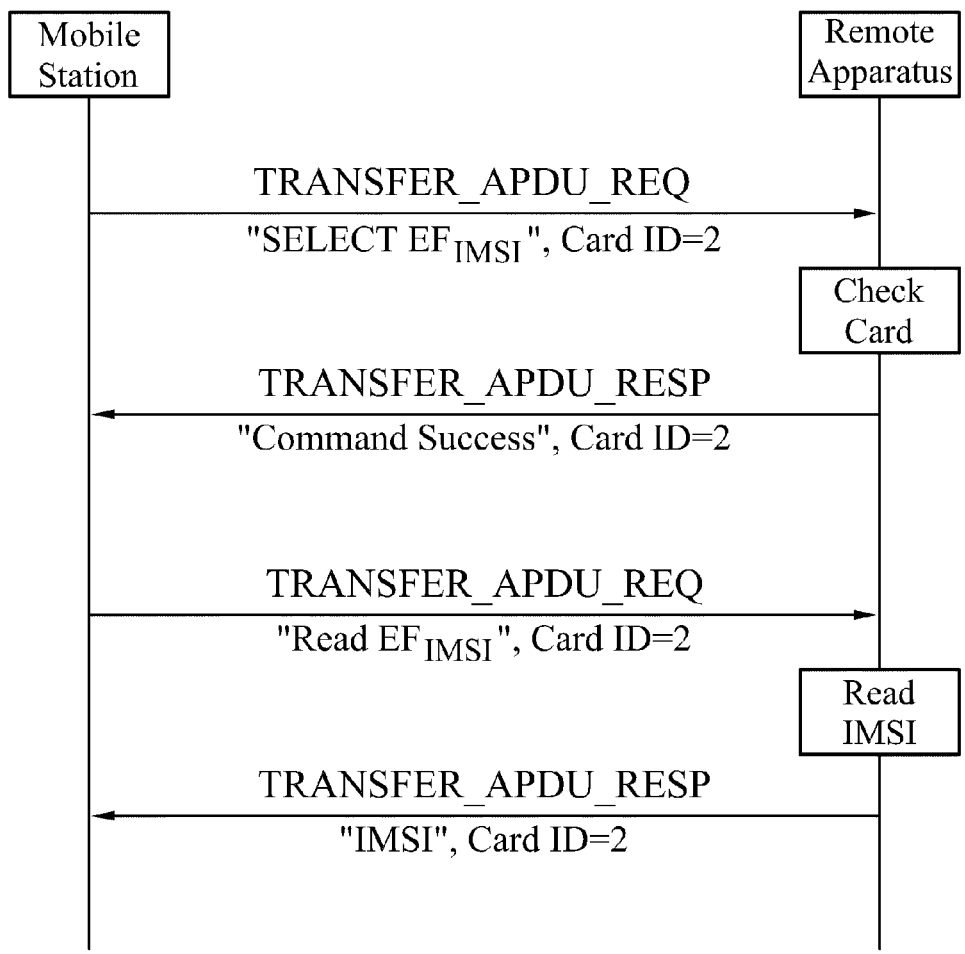
FIG. 7 shows a sequence diagram illustrating SAP message exchange for retrieving IMSI between a remote apparatus and a mobile station according to an embodiment of the invention.

FIG. 7 shows a sequence diagram illustrating SAP message exchange for retrieving IMSI between a remote apparatus and a mobile station according to an embodiment of the invention. As shown in FIG. 7, an example illustrates the mobile station retrieving the IMSI of the $2^{nd}$ subscriber identity card from the remote apparatus via Application Protocol Data Unit (APDU) transfer. The TRANSFER_APDU_REQ messages sent to the remote apparatus are called Command APDUs, while The TRANSFER_APDU_RESP messages sent by the remote apparatus are called Response APDUs. Both Command and Response messages contain an APDU in their payload. Command APDUs and Response APDUs only occur as pairs, where each Command APDU is followed by a Response APDU. The APDU exchange is always be initiated by the mobile station. After receiving the TRANSFER_APDU_REQ message comprising the parameters "SELECT $EF_{IMSI}$" and "Card ID=2", the remote apparatus may check whether the $2^{nd}$ subscriber identity card is switched off. If so, the remote apparatus sends the TRANSFER_APDU_RESP message with the result code "Error" to the mobile station. Otherwise, the remote apparatus sends the TRANSFER_APDU_RESP message with the parameters "Command Success" and "Card ID=2" to the mobile station.

Referring to FIG. 7, after receiving the TRANSFER_APDU_RESP message, the mobile station sends the TRANSFER_APDU_REQ message comprising the parameters "READ $EF_{IMSI}$" and "Card ID=2" to the remote apparatus, requesting for the IMSI of the $2^{nd}$ subscriber identity card. Next, the remote apparatus may control its controller (e.g. 320 of FIG. 3B) to couple the $2^{nd}$ subscriber identity card via a selecting circuit (e.g. 380 of FIG. 3B) to obtain the IMSI of the $2^{nd}$ subscriber identity card, or the remote apparatus may read its memory device to obtain the IMSI of the $2^{nd}$ subscriber identity card stored when the $2^{nd}$ subscriber identity card is switched on. Next, the remote apparatus sends the TRANSFER_APDU_RESP message with the IMSI of the $2^{nd}$ subscriber identity card to the mobile station. Subsequently, the mobile station may camp on a cell and communicate with a corresponding node via the camped on cell according to the IMSI of the $2^{nd}$ subscriber identity card. In an embodiment, the parameter "Card ID=2" is carried in the reserved field 62 of the header of the messages, as shown in FIG. 6. In an embodiment, the parameter "Card ID=2" is carried in the payload 64 of the messages. In addition to the IMSI, the mobile station may also send the APDU message to request for other information of the selected subscriber identity card, such as Location information (LOCI) and so on. Furthermore, when registering various channels, each SAP connection corresponding to one card ID may be established at one channel without carrying card ID information.

Figure 8:
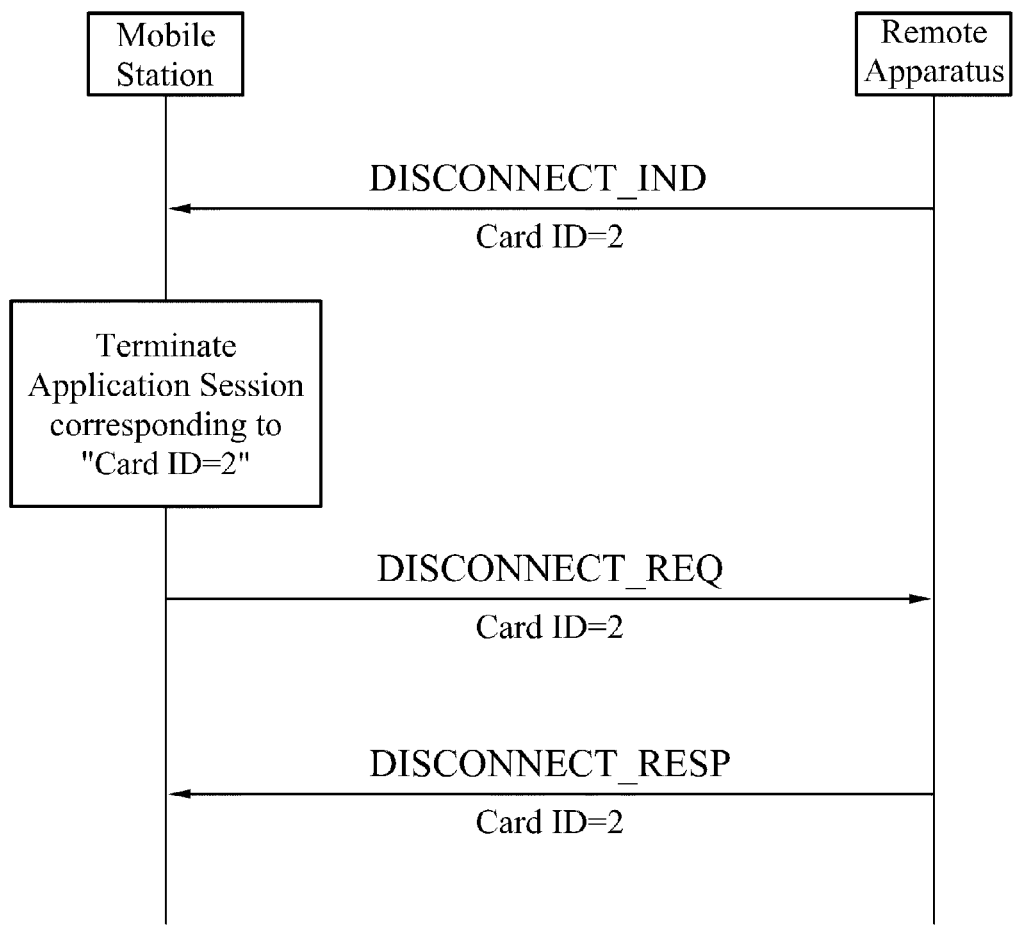
FIG. 8 shows a sequence diagram illustrating SAP message exchange for disconnecting SAP connection between a remote apparatus and a mobile station according to an embodiment of the invention.

FIG. 8 shows a sequence diagram illustrating SAP message exchange for disconnecting SAP connection between a remote apparatus and a mobile station according to an embodiment of the invention. If a subscriber identity card of the remote apparatus is disabled, the remote apparatus needs to release the SAP connection by sending the DISCONNECT_IND message to the mobile station. As shown in FIG. 8, an example illustrates the $2^{nd}$ subscriber identity card of the remote apparatus being disabled. First, the remote apparatus may send the DISCONNECT_IND message with the parameter "Card ID=2" to the mobile station. Next, the mobile station may terminate the GSM, USIM or R-UIM application session corresponding to the $2^{nd}$ subscriber identity card. For example, the mobile station may perform a subscriber identity card removal procedure to stop camping on the cell corresponding to the $2^{nd}$ subscriber identity card. After terminating the application session corresponding to the $2^{nd}$ subscriber identity card, the mobile station may send the DISCONNECT_REQ message with the parameter "Card ID=2" to the remote apparatus, and then the remote apparatus may answer with the DISCONNECT_RESP message with the parameter "Card ID=2". Thereafter, the RFCOMM channel between the remote apparatus and the mobile station shall be immediately disconnected. In an embodiment, the parameter "Card ID=2" is carried in the reserved field 62 of the header or the payload 64 of the messages, as shown in FIG. 6. In an embodiment, when registering various channels, each SAP connection corresponding to the one card ID may be established at one channel without carrying card ID information.

Figure 9:
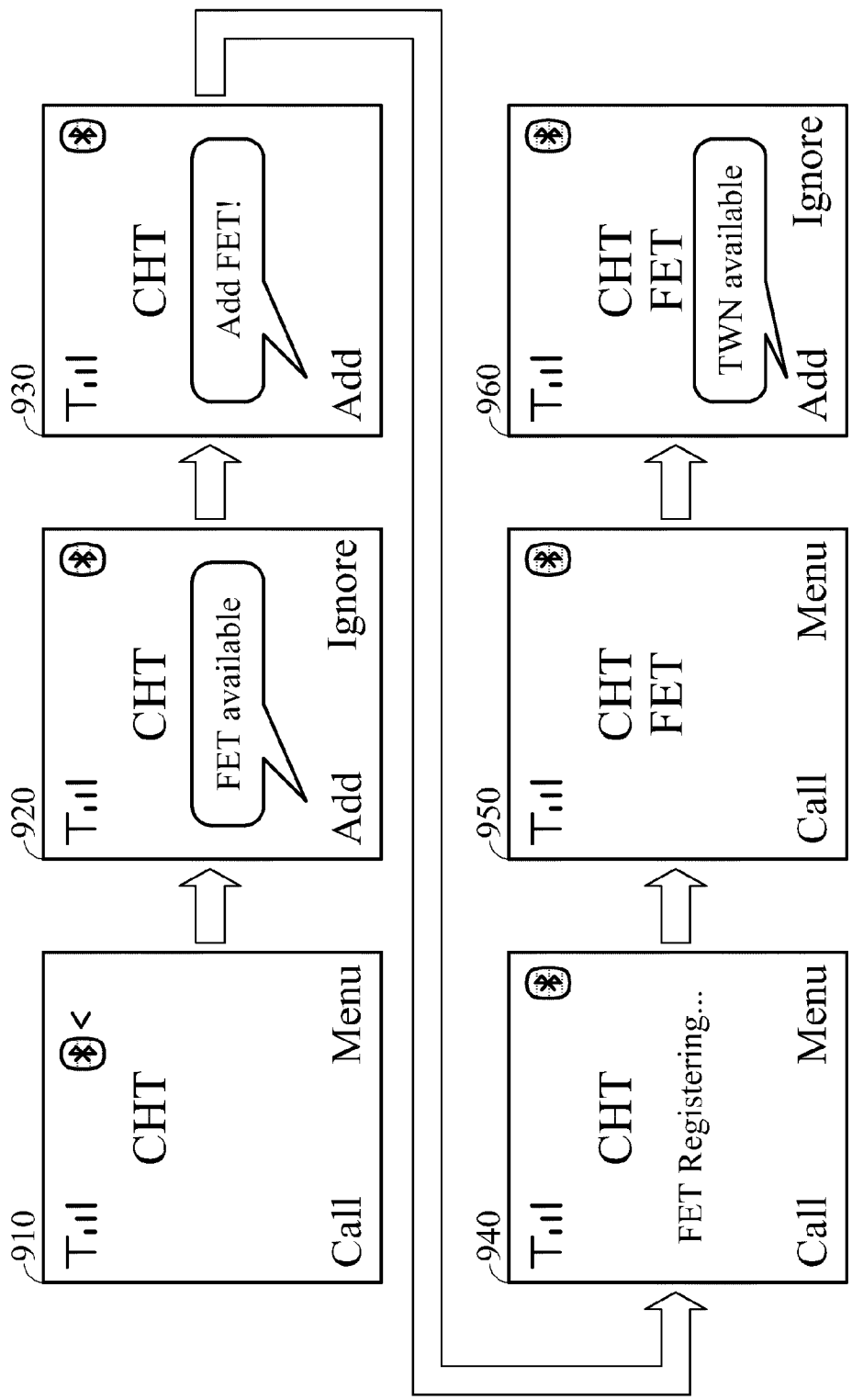
FIG. 9 shows an example illustrating a user interface (UI) of a mobile station when the remote subscriber identity cards are added for the mobile station.

FIG. 9 shows an example illustrating a user interface (UI) of a mobile station when the remote subscriber identity cards are added for the mobile station. On the display 910, it is shown that the mobile station has camped on an operator "CHT" according to the subscriber identity card inserted in the mobile station, and a Bluetooth connection between the mobile station and a remote apparatus with two remote subscriber identity cards is established. The two remote subscriber identity cards are provided by two operators "FET" and "TWN". The displays 920-960 show the adding and registering processes when the two subscriber identity cards inserted in the remote apparatus are enabled.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A system for providing remote subscriber identity cards to a mobile station, wherein the remote subscriber identity cards comprises a first subscriber identity card and a second subscriber identity card, comprising:
a Bluetooth module establishing a Bluetooth connection to the mobile station;
a controller accessing the first and second subscriber identity cards to obtain identity information and providing the obtained information to the mobile station via the Bluetooth connection such that the mobile station camps on a first cell according to the obtained information corresponding to the first subscriber identity card and a second cell according to the obtained information corresponding to the second subscriber identity card;
a selecting circuit selectively coupling the controller to the first subscriber identity card or the second subscriber identity card so as to access the coupled subscriber identity card;
a first switch enabling or disenabling the first subscriber identity card; and
a second switch enabling or disenabling the second subscriber identity card,
wherein the controller initiates a first operating voltage for the first subscriber identity card when the first switch is switched on, and the controller initiates a second operating voltage for the second subscriber identity card when the second switch is switched on,
wherein the selecting circuit further transfers clock and reset signals from the controller to the coupled subscriber identity card and transfers data signal between the controller and the coupled subscriber identity card,
wherein when the first or second subscriber identity card is enabled, the controller sends a card reset requirement with a specific card ID corresponding to the enabled subscriber identity card, to the mobile station via the Bluetooth connection, and in response to the card reset requirement, the mobile station sends a Answer To Reset (ATR) requirement with the specific card ID, to the controller via the Bluetooth connection.

2. The system as claimed in claim 1, further comprising a memory device for storing the obtained information.

3. The system as claimed in claim 1, wherein the obtained information comprises information regarding a first international mobile subscriber identity (IMSI) of the first subscriber identity card and a second IMSI of the second subscriber identity card.

4. The system as claimed in claim 1, wherein when the first switch is switched off, the controller notifies the mobile station via the Bluetooth connection to stop camping on the first cell, and when the second switch is switched off, the controller notifies the mobile station via the Bluetooth connection to stop camping on the second cell.

5. The system as claimed in claim 1, further comprising:
an input device receiving a specific code when the subscriber identity card is protected; and
a display device displaying the status and information of the subscriber identity card.

6. A system for providing a subscriber identity card to a mobile station, comprising:
a Bluetooth module establishing a Bluetooth connection to the mobile station;
a controller accessing the subscriber identity card to obtain identity information and providing the obtained information to the mobile station via the Bluetooth connection such that the mobile station camps on a cell according to the obtained information;
a switch for enabling or disenabling the subscriber identity card,
wherein the controller initiates an operating voltage for the subscriber identity card when the switch is switched on, so as to enable the subscriber identity card,
wherein the controller access the subscriber identity card after the subscriber identity card is enabled,
wherein when the subscriber identity card is enabled, the controller sends a card reset requirement with a specific card ID to the mobile station via the Bluetooth connection, and in response to the card reset requirement, the mobile station sends a Answer To Reset (ATR) requirement with the specific card ID to the controller via the Bluetooth connection.

7. The system as claimed in claim 6, further comprising a memory device for storing the obtained information.

8. The system as claimed in claim 6, wherein the obtained information comprises information regarding an international mobile subscriber identity (IMSI) of the subscriber identity card.

9. The system as claimed in claim 6, wherein the controller notifies the mobile station to stop camping on the cell via the Bluetooth connection when the switch is switched off.

10. The system as claimed in claim 6, further comprising:
an input device receiving a specific code when the subscriber identity card is protected; and
a display device displaying the status and information of the subscriber identity card.

11. A method for accessing a remote subscriber identity card enabled in a remote apparatus, performed by a mobile station, comprising:
establishing a Bluetooth connection between the remote apparatus and the mobile station;
obtaining the identity information from the remote apparatus via the Bluetooth connection;
camping on a cell using the identity information;
obtaining a notification from the remote apparatus via the Bluetooth connection, indicating that a switch of the remote apparatus corresponding to the remote subscriber identity card is switched off such that the remote subscriber identity card is disabled; and
stopping camping on the cell in response to the notification and disconnecting a Radio Frequency Communication (RFCOMM) channel between the remote apparatus and the mobile station.

12. The method as claimed in claim 11, wherein the identity information comprises information regarding to an international mobile subscriber identity (IMSI) of the subscriber identity card.

13. The method as claimed in claim 11, the notification is carried by an DISCONNECT_IND message.

14. The method as claimed in claim 11, the identity information is carried by an Application Protocol Data Unit (APDU) message.

15. A method for providing a subscriber identity card to a mobile station, performed by a remote apparatus, comprising:
establishing a Bluetooth connection to the mobile station;
initiating an operating voltage for the subscriber identity card when a switch of the remote apparatus is switched on, so as to enable the subscriber identity card;
sends a card reset requirement with a specific card ID to the mobile station via the Bluetooth connection when the subscriber identity card is enabled;
accessing the subscriber identity card after the subscriber identity card is enabled, so as to obtain identity information; and
providing the obtained identity information to the mobile station via the Bluetooth connection such that the mobile station camps on a cell according to the obtained information,
wherein the mobile station sends a Answer To Reset (ATR) requirement with the specific card ID to the controller via the Bluetooth connection in response to the card reset requirement.

16. The method as claimed in claim 15, further comprising:
notifying the mobile station to stop camping on the cell via the Bluetooth connection when the switch of the remote apparatus is switched off.

17. The method as claimed in claim 15, wherein the identity information comprises information regarding to an international mobile subscriber identity (IMSI) of the subscriber identity card.

18. The method as claimed in claim 15, the identity information is carried by an Application Protocol Data Unit (APDU) message.

19. A method for providing a subscriber identity card to a mobile station, performed by a remote apparatus having a plurality of subscriber identity cards, comprising:
establishing a Bluetooth connection to the mobile station;
receiving a command from the mobile station via the Bluetooth connection, wherein the command comprises information regarding a specific card ID;
sending a success message with the specific card ID to the mobile station via the Bluetooth connection when the subscriber identity card corresponding to the specific card ID is enabled;
electrically connecting to the subscriber identity card corresponding to the specific card ID when the subscriber identity card corresponding to the specific card ID is enabled;
receiving a read command from the mobile station via the Bluetooth connection, wherein the mobile station sends the read command in response to the success message;
obtaining identity information of the connected subscriber identity card in response to the read command; and
providing the obtained identity information to the mobile station via the Bluetooth connection.

20. The method as claimed in claim 19, further comprising:
checking whether the subscriber identity card corresponding to the specific card ID is enabled; and
sending a failure message to the mobile station via the Bluetooth connection when the subscriber identity card corresponding to the specific card ID is disabled.

21. The method as claimed in claim 20, wherein the subscriber identity card is enabled or disabled by a switch of the remote apparatus.

22. The method as claimed in claim 19, wherein the identity information comprises information regarding to an international mobile subscriber identity (IMSI) of the subscriber identity card.

23. The method as claimed in claim 19, the identity information is carried by an Application Protocol Data Unit (APDU) message.

* * * * *